United States Patent [19]

Halfhill et al.

[11] 4,214,280
[45] Jul. 22, 1980

[54] METHOD AND APPARATUS FOR RECORDING DATA WITHOUT RECORDING ON DEFECTIVE AREAS OF A DATA RECORDING MEDIUM

[75] Inventors: Martin O. Halfhill, San Jose, Calif.; James O. Jacques, Limerick, Pa.

[73] Assignee: Xerox Corporation, Stamford, Conn.

[21] Appl. No.: 911,006

[22] Filed: May 30, 1978

[51] Int. Cl.² .......................... G11B 5/09; G11B 15/04
[52] U.S. Cl. ........................................... 360/53; 360/60
[58] Field of Search ..................... 360/31, 39, 53, 61, 360/72, 60

[56] References Cited

U.S. PATENT DOCUMENTS

| | | | |
|---|---|---|---|
| 3,261,003 | 7/1966 | Cogar et al. | 360/53 |
| 3,506,814 | 4/1970 | MacDonald et al. | 360/31 |
| 3,517,305 | 6/1970 | Schwartz et al. | 360/53 |
| 3,761,905 | 9/1973 | Hollstein, Jr. et al. | 360/53 |
| 3,774,154 | 11/1973 | Devore et al. | 360/53 |
| 3,947,875 | 3/1976 | Bull et al. | 360/31 |
| 3,996,558 | 12/1976 | Heun | 360/53 |

OTHER PUBLICATIONS

"Disk File Test Equipment"—P. Blythin, IBM Tech. Dis. Bul., vol. 19, #10, 3/77.

*Primary Examiner*—Vincent P. Canney
*Attorney, Agent, or Firm*—Barry Paul Smith

[57] ABSTRACT

A method of transferring data between a data supply and a disk having a track divided into sectors, each sector having an address recording area followed by a data recording area. The method includes detecting a defective area on a data recording area; writing an address of the defective area on the corresponding address recording area; recording data on the data recording area by detecting the defective area with the address and writing part of the data on the data recording area up to the defective area, and writing the remaining data on the data recording area succeeding the defective area; and retrieving the written data by reading the address of the defective area and then reading the recorded data. The apparatus includes a circuit to record a test pattern on the disk, a circuit to sense the recorded test pattern and provide an address of a defective area, a circuit to write the address on the address recording area, a circuit to write data on the disk, and a circuit to read the recorded area.

12 Claims, 13 Drawing Figures

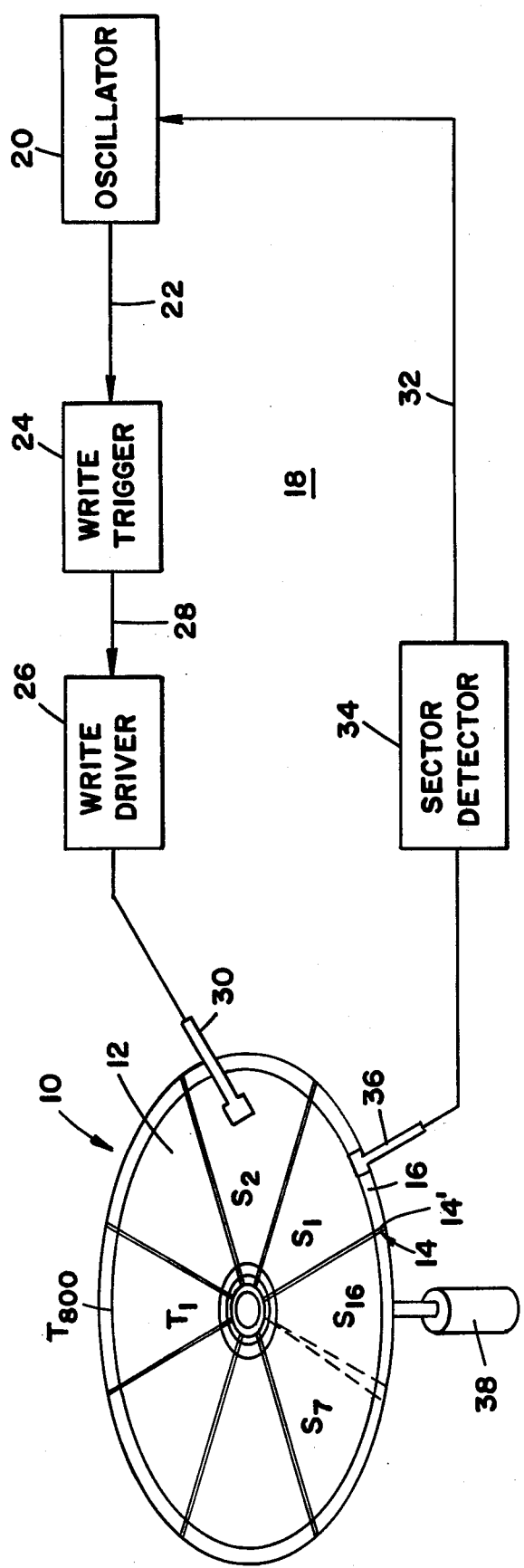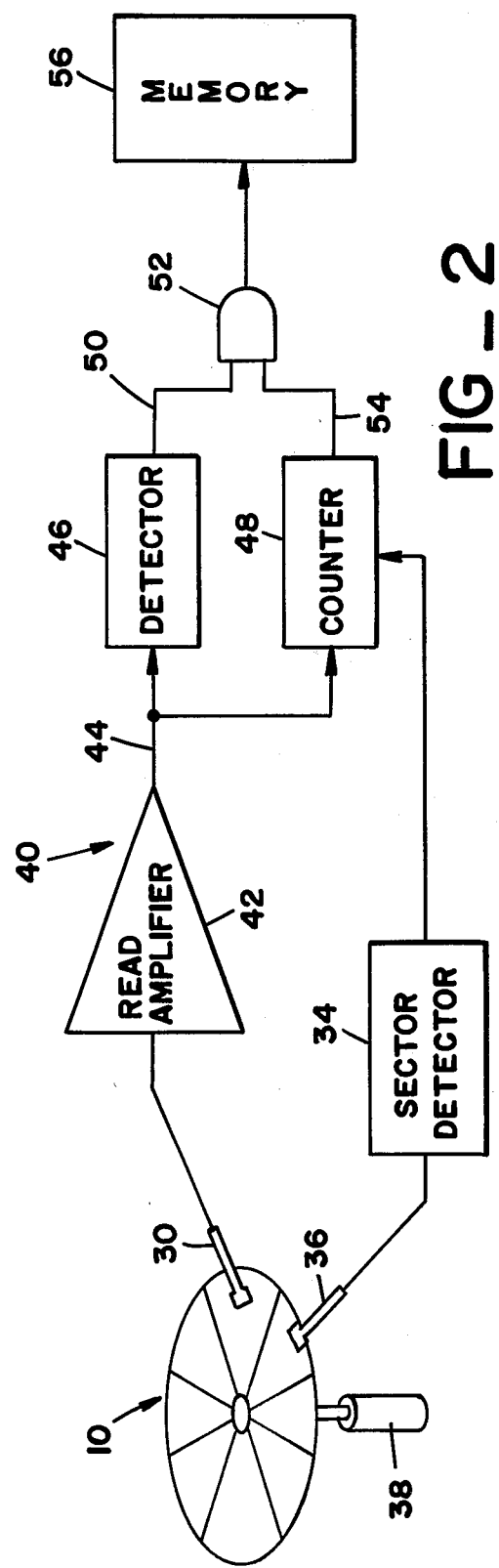

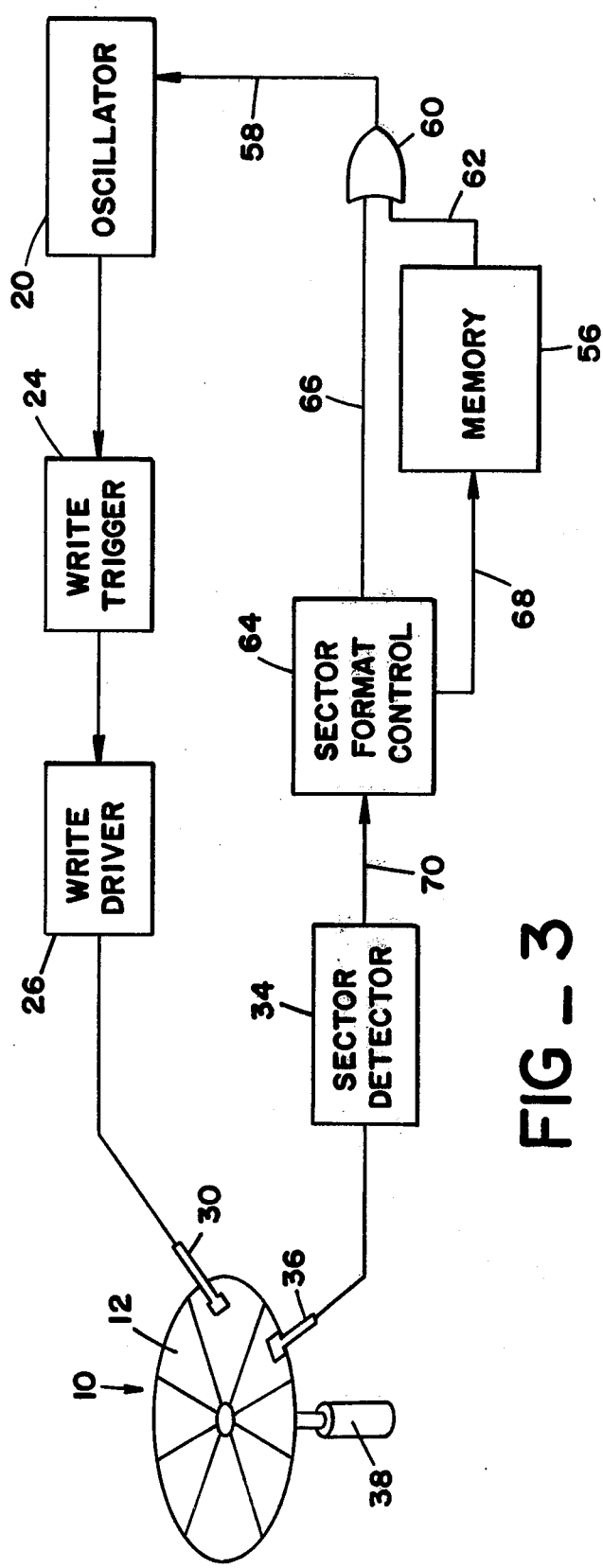
FIG_3
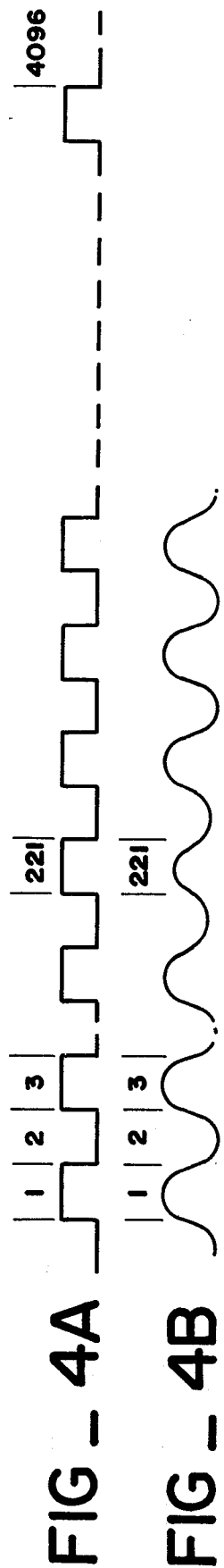
FIG_4A
FIG_4B

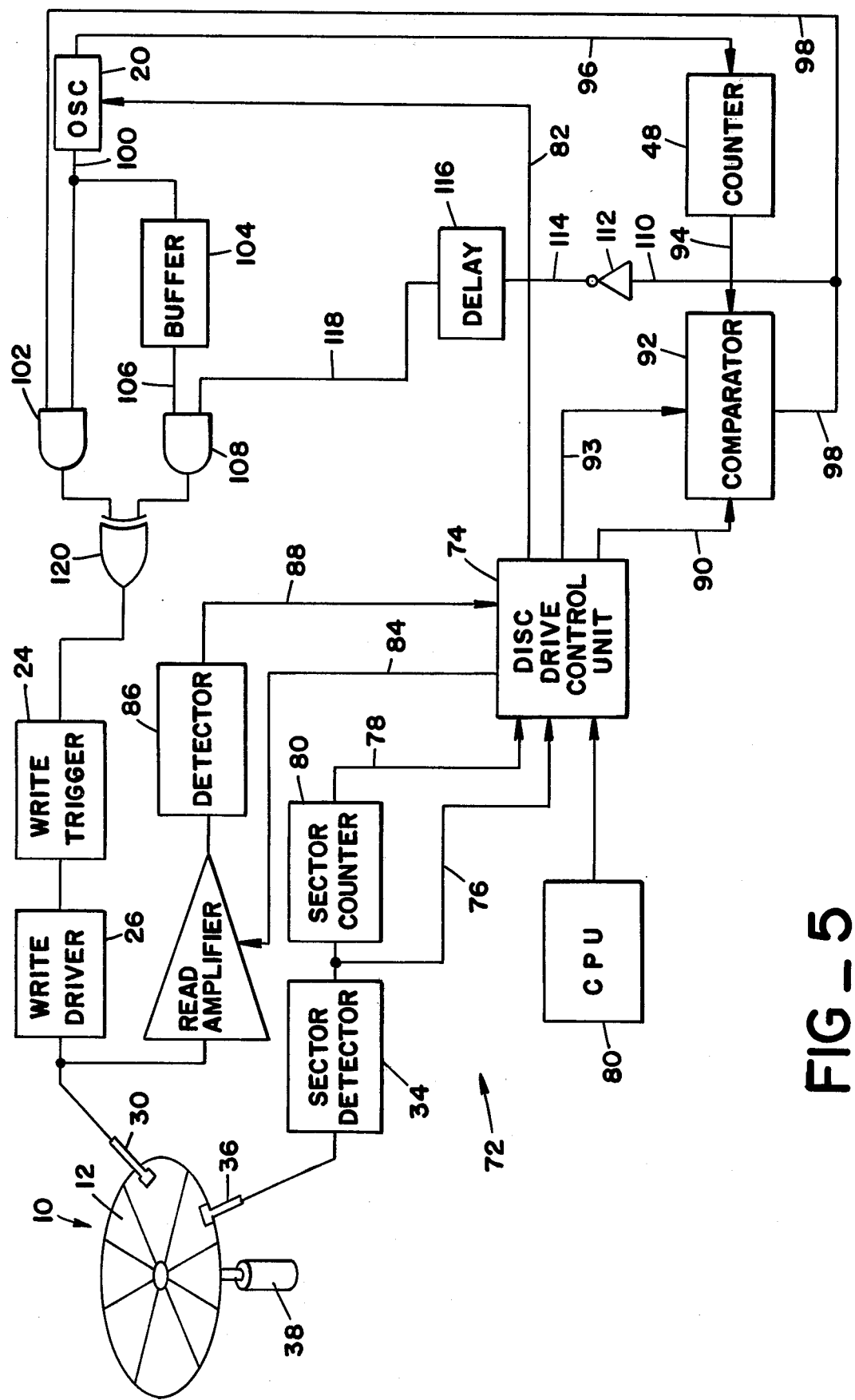
FIG_5

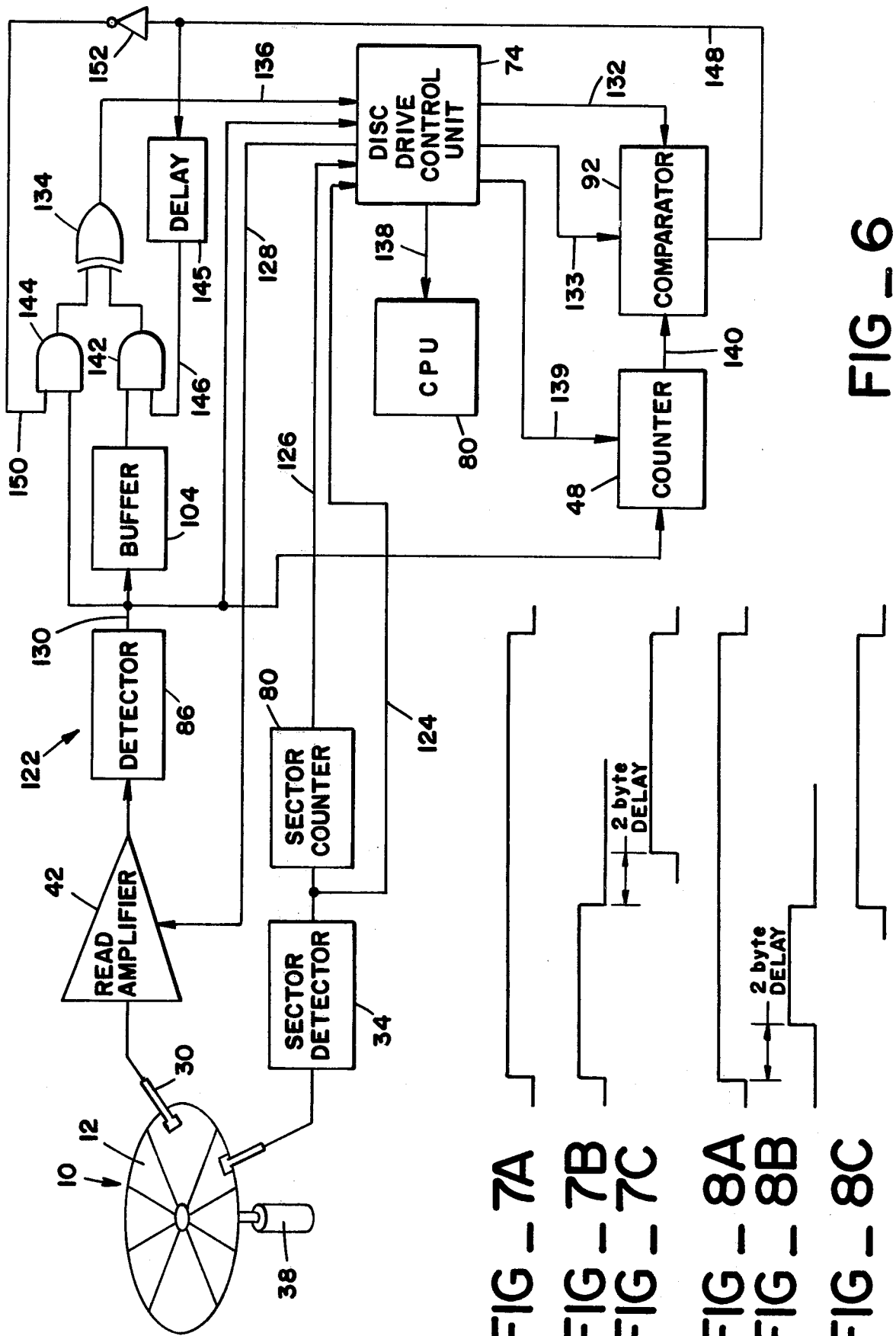

METHOD AND APPARATUS FOR RECORDING DATA WITHOUT RECORDING ON DEFECTIVE AREAS OF A DATA RECORDING MEDIUM

BACKGROUND OF THE INVENTION

This invention relates to data storage and retrieval systems and, more particularly, to a method and apparatus for detecting defective areas on a recording medium and transferring data between the recording medium and a data supply unit, bypassing the defective areas.

Various types of information retrieval systems have been developed including those which utilize bulk storage devices for processing digital data. One type of bulk storage device includes a disk file having at least one magnetic recording disk in which information is stored on the surfaces of the disk. Each surface has a plurality of concentric tracks on which are stored the data, with each track being divided into one or more sectors. Typically, the data is recorded on each track by magnetizing the recording surface. Usually, bits of information are recorded, each of which may be a logic "1" or "0" distinguishable by a change or transition of magnetization of the surface.

In the manufacture of disks, a magnetic coating is formed on the surface of the disk for subsequent magnetization by the disk user in accordance with the information to be stored. However, various problems occur with information storage systems using these magnetic disks due to defective areas on the recording surface. There are areas in which there may be no magnetic coating or an insufficient amount of such coating, i.e., imperfections, to properly record data on the disk, or to properly distinguish magnetic transitions when reading the data. One problem involves data integrity in that the user may not be assured that the data is being properly written on or read from the recording surface due to the defective areas. Another problem is that if the user is reading incorrect data from the recording surface due to the defective areas, then additional time might be used to reread the data until the desired information is retrieved, thereby undesirably increasing throughput.

As a result of these problems, both the manufacturer of the disks, and the manufacturer of disk drives which write and retrieve the data on the disks, have taken precautions to minimize the effects of defective areas on recording surfaces. After the magnetic coating is placed on the recording surface, the disk manufacturer will test the disk before distributing it for use with the disk drives. If too many defective areas are found, the disk will be discarded; otherwise, it will be distributed to the user with a specified number of defective areas on it. This specification may not be entirely satisfactory since during use of the disk additional defective areas may appear if the disk wears or dirt gets imbedded on the disk, or the original defective areas may grow in size.

The disk drive manufacturer, on the other hand, may include in the drive or control unit a circuit to detect the defective areas to record the data on other areas of the recording surface. Consequently, the disk manufacturer will provide spare areas on which to record data which cannot be written on the defective areas. In one solution, the disk will have spare data tracks, while in another approach the disk will have one or more spare sectors for a given track. Upon detection of a sector of a given track having a defective area, the disk drive circuit will cause a relocation of all the data intended for that sector onto the spare track or the spare sector of the given track, depending on the system being used. In retrieving the recorded data, when the sector having the defective area is detected, the data will then be read either from the spare track or from the spare sector, depending on the system being used.

Either of the above disk drive techniques for avoiding recording on the defective areas results in a loss in data storage capacity. The more spare tracks or sectors needed to account for all the defective areas existing or anticipated on the recording surface, the less capacity there is on the disk for storing the data. Also, the time for accessing the data on recording surfaces having spare recording areas may be significantly and undesirably increased. For example, in a disk having the spare tracks, these may be the inner concentric tracks of the recording surface. If data is being read or written on an outer track on the recording surface, and a sector of this outer track having a defective area is detected, then additional time will be required to move the recording head to an inner spare track to read or write the desired data. Additional time may also then be needed to return the recording head to the outer track to continue reading or writing data on this outer track. In a system using a spare sector of a given track, when a sector having a defective area is detected, the data transfer operation may have to cease temporarily until the disk can be rotated to position the spare sector under the recording head; thereafter, the data transfer operation again may have to cease until the disk again rotates to position an appropriate nondefective sector of the track under the recording head for reading or writing the data.

Another disadvantage with the above disk drive techniques relates to small, newly grown defective areas which cannot be detected due to the sensitivity of the disk drive detector circuit. This will result in a loss in data integrity which may require the disk drive user to reread or rewrite data on the recording surface, thereby undesirably increasing throughput. Alternatively, the user of the disk drive would have to take into consideration these undetectable defective areas on a recording surface when planning to use the storage system since such areas may reduce the specified capacity of the disk. In other words, in utilizing such disk drive, the user knows that the disk drive may not be optimum in the sense that additional and undetectable areas will have to be accounted for in planning the amount of data that can be stored on the disk.

SUMMARY OF THE INVENTION

It is an object of the present invention to provide a novel apparatus and method which results in the transfer of data between a storage medium and a data supply unit without recording on the defective areas of the medium.

It is another object of the present invention to provide apparatus and methods for maximizing storage capacity of a storage medium despite the existence of defective areas on the medium, while making no compromise in the quality of the usable recording area.

A still further object of the present invention is to provide apparatus and methods which maximize throughput.

A yet further object of the present invention is to minimize or eliminate any preplanning by a disk drive user to account for a growth of defective areas on the recording medium.

These and other objects of teh present invention are obtained through a unique technique for identifying defective areas on a data recording surface and for transferring data between the recording medium and a data supply unit. Apparatus and methods are provided for identifying defective areas on a recording medium having a track divided into one or more sectors with each sector having an address recording area and a data recording area. A defective area within a data recording area of a sector is detected and an address of the defective area written on the corresponding address recording area. Apparatus and methods are also provided to write all the data intended for the sector having the defective area on the data recording area of such sector except on the defective area. Apparatus and methods are also provided for then retrieving all the data recorded on the sector having the defective area.

BRIEF DESCRIPTION OF THE DRAWINGS

FIG. 1 is a block diagram of a circuit for recording a test pattern on a disk.

FIG. 2 is a block diagram of a circuit for locating defective areas on the disk.

FIG. 3 is a block diagram of a circuit for writing addresses of the defective areas on the disk.

FIG. 4A illustrates a waveform for recording the test pattern on the disk.

FIG. 4B is an illustration of the test pattern waveform which is read from the disk.

FIG. 5 is a block diagram of a circuit for writing data on the disk, except over the defective areas.

FIG. 6 is a block diagram of a circuit for reading the data recorded on the disk with the circuit of FIG. 5.

FIGS. 7A–7C are timing diagrams useful in explaining the operation of the circuit of FIG. 5.

FIGS. 8A–8C are timing diagrams useful in explaining the operation of the circuit of FIG. 6.

DETAILED DESCRIPTION OF THE DRAWINGS

The circuits shown in FIGS. 1–3 and 5–6 may be divisible into two separate systems for carrying out the principles of the present invention. The circuits of FIGS. 1–3 may be utilized by a disk manufacturer to test for defective areas on the disk, and to record an identification of the detected defective areas on the disk. The circuits of FIGS. 5–6 may be part of a disk drive made by the disk drive manufacturer to enable a user of the disk drive and the disks having the defective areas to transfer data between the disk and a data supply unit. However, it will be appreciated from the following discussion by those skilled in the art that all of the these circuits can be embodied in a single disk drive to store data on the disk except on the defective areas and to retrieve such data from the disk. Furthermore, while the invention will be described in relation to disk storage mediums and disk drives, it will also be appreciated that the invention can be applied to other bulk storage systems using, for example, magnetic tape.

In FIG. 1 there is shown a disk 10 having a recording surface 12 which is magnetizable in accordance with well known principles to store bits of information on discrete areas of the surface. The surface 12 is organized into a plurality of concentric tracks T and a plurality of wedge-shaped sectors S. For example, the surface 12 may have eight hundred tracks $T_1$–$T_{800'}$, each divided into sixteen sectors $S_1$–$S_{16}$. Each sector S has a sector identification area 14 and a data recording area 16.

In addition to other well known information which need not be described for purposes of an understanding of the present invention, the sector identification area 14 eventually will store an address of a defective area within the data recording area 16, and the area 16 eventually will store the desired data. Thus, the sector identification area 14 will have an address recording or storage area 14'.

Also shown in FIG. 1 is a circuit 18 for writing a test pattern of bits on any one or more tracks $T_1$–$T_{800}$ of the recording surface 12. Circuit 18 includes an oscillator 20 which outputs a constant frequency signal over a line 22 to a write trigger 24 which responds to the signal from oscillator 20 to trigger a write driver 26 via a signal on a line 28. The driver 26 may be a current source which outputs a test pattern current signal of constant frequency, shown in FIG. 4A, which is fed to a standard read/write recording head 30 for recording bits on the data recording areas 16 of each sector S. Oscillator 20 is energized in response to a control signal on a line 32 from a sector detector 34 that responds to the output from a head 36 which, for example, sense a conventional prerecorded sector mark (not shown) at the beginning of each sector identification area 14 of each sector S. Head 36 and detector 34 also detect an end of sector mark (not shown) at the end of each sector S to produce a control signal on line 32 to de-energize oscillator 20. A motor 38 rotates the disk 10 to move the sectors S past the heads 30 and 36.

In the operation of the circuit 18, the head 30 will be positioned over a particular track T and motor 38 energized to rotate the disk 10. When a sector S is detected by the head 36 and detector 34, oscillator 20 will be energized by the control signal on line 32 so that the head 30 will record the test pattern signal shown in FIG. 4A on the corresponding data recording area 16. When the end of sector mark is detected, oscillator 20 will be de-energized to avoid writing the test pattern signal on the area 14 of the succeeding sector S. This signal will be recorded on each sector S of the track T and, thereafter, the head 30 may be moved by a servo mechanism (not shown) to a new track T to record the test pattern in the smae manner on each of its sectors S.

As one example, each data recording area 16 of each sector S of each track T may have a capacity of 4096 bits or 512 bytes, there being 8 bits per byte. Accordingly, the test pattern signal shown in FIG. 4A illustrates 4096 half cycles numbered 1–4096, with each half cycle corresponding to 1 bit.

With the test pattern signal recorded on all tracks $T_1$–$T_{800}$ of the surface 12, a circuit 40 shown in FIG. 2 then will be utilized to detect and identify defective areas on the surface 12. In this FIG. 2, like reference numerals are used to indicate like elements shown in FIG. 1. Circuit 40 includes a read amplifier 42 which amplifies the test pattern information on surface 12 read by the head 30 and provides an output signal over a line 44 to a detector 46 and a counter 48, this output being shown in FIG. 4B. As indicated in FIG. 4B, each half cycle of this waveform corresponds to a bit recorded on data recording area 16 with the waveform of FIG. 4A.

Detector 46 is an amplitude detector which senses the output signal shown in FIG. 4B from the read amplifier 42 and produces an output signal on a line 50 when there is a reduction in amplitude greater than a predetermined value, as will be more fully described. Counter 48, which may be either a bit or byte counter, but prefereably in the latter, is activated by sector detector 34 at the beginning of each data recording area 16 of each sector S to count the test pattern data from amplifier 42 after the start of sector mark is detected. Counter 48 will be reset at the end of each recording area 16 in a well known manner, such as by detecting the end of sector mark (not shown) to begin counting test pattern data on the next data recording area 16. An And gate 52 receives the count in counter 48 as one input over a line 54 and the output of detector 46 on line 50 as another input which enables the gate 52 to transfer this count to a memory 56 for storage.

In the operation of circuit 40, the head 30 will be positioned over a single track T and the motor 38 energized. As head 30 reads the test pattern data recorded on surface 12 with the circuit 18, amplifier 42 will output the signal shown in FIG. 4B to detector 46. At this time head 36 and detector 34 will have detected the start of sector mark in a sector so that counter 48 will begin counting the data from amplifier 42. If an area on surface 12 for the recording of a bit is defective, there will be an amplitude variation in the output signal, for example, as shown in FIG. 4B for bit 221. Consequently, upon detection of this amplitude variation, gate 52 will be enabled to transfer the count in counter 48 into memory 56 to store a count or address corresponding to this defective area. If counter 48 were a byte counter, this count stored in memory 56 would be 27. As each sector S of a given track T rotates beneath heads 30 and 36, defective areas will be detected and addresses to these defective areas stored in memory 56 as just described. After testing a given track T for the defective areas and identifying them in memory 56 with an address, the head 30 will be moved to a new track T to detect and identify in the same manner the defective areas on this new track.

Before continuing with a discussion of the circuit shown in FIG. 3, it will be helpful to discuss more specifically one feature of detector 46 for this invention. As illustrated in FIG. 4B, there is a reduction in the amplitude of the read-back signal corresponding to bit 221. This amplitude reduction indicates that the recording area on surface 12 for bit 221 of a given sector S and track T does not have a satisfactory magnetizable coating as in the other bit areas. While it may be suitable for purposes of data integrity to use initially a recording surface 12 in which there is a reduction in amplitude by as much as fifty percent, this would not be satisfactory in the long term since continued use may cause the surface 12 to be worn such that there might be a reduction in amplitude greater than fifty percent. Consequently, detector 46 could be a very sensitive amplitude detector which can detect a reduction in amplitude of only about ten percent. Thus, if there is a relatively small reduction in amplitude of the signal corresponding to bit 221, this will be detected by detector 46 to enable gate 52.

Moreover, when the signal of FIG. 4B indicates that there is even as little as a ten percent reduction in amplitude for a particular bit, the probability is relatively high that during use of the recording surface 12 this potentially defective area will grow by several bits so that, for example, eventually the entire defective area may be ten bits wide extending from bits 217 to 226. Therefore, provision is made in the circuits of FIGS. 5-6 to account for this potential growth up to a maximum bit length, which throughout this disclosure will be assumed to be 2 bytes or 16 bits.

It also should be noted that for purposes of simplifying the description of the invention, it is being assumed that the recording surface 12 has been manufactured with only one defective bit area or potentially defective bit area per sector S of each track T, such as the area for bit 221 in the example given above. If there is detected during testing, more than one such defective bit area per sector S per track T, then the disk 10 may be considered to be unsuitable for use and, therefore, may be discarded. However, it will be appreciated that the principles of the present invention will still apply if in fact there is more than one such defective bit area spaced outside the maximum bit length accounted for in detecting bit 221. For example, if a disk 10 having these two defective bit areas is considered to be acceptable, then two addresses per sector S per track T could be stored in memory 56.

With the testing completed and the addresses stored in the memory 56, it is now necessary to record these addresses on the appropriate address recording areas 14' of each sector S of each track T, and this is the function of the circuit of FIG. 3. In this FIG. 3, like reference numerals are used to indicate like elements shown in FIGS. 1 and 2. The recording head 30, which will now be in the write mode, receives signals from the oscillator 20 through the write trigger 24 and write driver 26 to record information on the recording surface 12 of disk 10. Oscillator 20 is activated by the output signals on a line 58 from an Or gate 60 whose two inputs are the output on a line 62 from the memory 56 or the output of a sector format control 64 over a line 66. The sector format control 64 is well known in the art and functions to output digital information which is to be recorded on the sector identification areas 14, this information being, for example, synchronization bytes and other sector format information well known in the art. Format control 64 also starts memory 56 via a control signal on a line 68 to access the memory 56 and record its addresses on the address recording area 14' of the sector identification areas 14. The head 36 and sector detector 34 are connected over line 70 to format control 64 to activate control 64 at the beginning of each sector S.

In the operation of the circuit of FIG. 3, when head 36 and sector detector 34 detect a sector mark indicating the beginning of a sector S of a given track T, the sector format control 64 will be activated to sequentially output digital sector format information through gate 60 to oscillator 20. Consequently, oscillator 20 will output signals in accordance with this information from line 58 to enable recording head 30 to write the required information on the area 14. When all of this sector format information is recorded, control 64 will output a signal on line 68 to access memory 56 at the memory location storing the address of a defective area within a particular sector S for a given track T. This address will be supplied through gate 60 to activate oscillator 20 which will then cause head 30 to write this address on the appropriate address recording area 14' of sector identification area 14. This operation continues with the recording head 30 over a single track T until all the sectors S are written with the sector format and defective area address information. Then, recording head 30 can be moved to a new track T and the circuit of FIG. 3 operated in a similar manner to record the appropriate information on the areas 14 for each sector S. Of course, if a data recording area 16 of a given sector S of a given track T has no defective area, then no defective address will be recorded on the corresponding area 14.

The method of storing addresses of defective areas on disk 10 has been described as first writing a test pattern on all the tracks, then storing addresses in memory 56 for all the tracks, and finally recording these addresses on all the tracks. However, this storing of addresses of disk 10 can be accomplished, for example, on a sector-by-sector basis for each track. That is, first a given sector S of a given track T can have a test pattern written on it with the circuit of FIG. 1. Then, the disk 10 can be rotated to bring this given sector S under head 30 to generate an address with the circuit of FIG. 2. Then, the disk 10 again can be rotated to bring this given sector S under head 30 to record the address with the circuit of FIG. 3. After these three steps, a new sector S of the given track can be provided with an address to a defective area, and so on until all the sectors are accounted for. Then, the head 30 can be moved to a new track T to record such address on its sectors S in a similar manner.

After testing for defective areas on the recording surface 12 and identifying any such areas by an address with the circuits of FIGS. 1-3, the disk 10 may now be distributed by the disk manufacturer for use with a disk drive having the circuits shown in FIGS. 5 and 6. The testing, however, as already noted, counld have been done on a customer disk drive rather than at a disk factory. As will be described, this will enable the user of the disk 10 and the disk drive shown in FIGS. 5 and 6 to record and retrieve data on the recording surface 12, except on the defective areas or potentially defective areas identified by the addresses stored on the address recording areas 14' of the sector identification areas 14. Furthermore, it will be shown that the user can write or read data on the recording surface 12 without even being aware that some areas of the data recording areas 16 may be defective. Thus, the user need not have to preplan the amount of data which can be stored on the disk 10 to account for any loss in capacity due to defective areas on the disk 10.

FIG. 5 illustrates a circuit 72 for writing digital data on the surface 12 of disk 10. In this FIG. 5 like numerals again are used to indicate like elements in the other figures. A disk drive control unit 74, well known in the art, has a number of inputs and outputs to control the writing of data on the recording surface 12. The unit 74 has one input 76 connected to the output of sector detector 34 and another input on a line 78 from the output of a sector counter 80 which counts the sectors S from $S_1$-$S_{16}$. Data to be recorded on recording surface 12 is supplied by a central processing unit 80 as another input to the disk drive control unit 74, this data being routed to oscillator 20 via an output line 82 of the control unit 74. Another output line 84 couples the control unit 74 to the read amplifier 42 to activate this amplifier to read the information recorded on the sector identification area 14 of each sector S, this amplified information being processed by a conventional amplitude detector 86 for delivery over a line 88 as another input to the control unit 74. Addresses of the defective areas on line 88 will be routed by the control unit 74 over an output line 90 as one input to a comparator 92.

When head 36 and sector detector 34 detect a sector S, the signal on line 76 instructs the disk drive control unit 74 to activate the read amplifier 42 via a signal on line 84 to couple and amplify the information read by head 30 via detector 86 into the control unit 74. This unit 74 will then output the defective area address onto line 90 as one input to the comparator 92. When the sector counter 80 reaches a count corresponding to the sector S on which data is to be recorded, the control unit 74 will be activated to receive continuously the data from CPU 80 and route it over line 82 to the oscillator 20 for recording on the data recording area 16 of the particular sector S, and to activate comparator 92 via a signal on a line 93.

Comparator 92 receives as another input on a line 94 the count in byte counter 48 which receives the output of oscillator 20 via a line 96. As each bit of data is received by oscillator 20 over line 82, a corresponding output signal will be fed over line 96 and every eight bits or byte, counter 48 will have its count incremented by 1. The comparator 92 compares the address on line 90 to the count in counter 48 and provides an output control signal over a line 98 having one of two levels depending on whether a comparison is made.

The output signal from oscillator 20, which corresponds to the data over line 82, is fed over a line 100 as one input to an And gate 102 and as an input to a data delay or buffer 104 which is two bytes in length for reasons which will be described. The other input to the And gate 102 is the output signal from comparator 92 on line 98. The output of buffer 104 is fed over a line 106 as one input to another And gate 108. The output signal on line 98 is also fed over a line 110 to an inverter 112 whose output is then fed over a line 114 to a delay 116. The delay 116 provides a two-byte delay of its input signal, which corresponds to the delay of the data through the two-byte buffer 104, and provides an output signal on a line 118 as the other input to And gate 108. An exclusive-Or gate 120 receives the output of And gate 102 or And gate 108 to supply the data to the write trigger 24 and write driver 26 for recording by the head 30.

As will be described further, the data signal from oscillator 20 on line 100 will be processed to the recording head 30 via gates 102, 120, write trigger 24 and write driver 26 without delay, or via buffer 104, gate 108, gate 120, trigger 24 and driver 26 with buffer 104 providing a delay. In either event, the data will be received continuously from the CPU 80 when requested, though head 30 will not continuously record this date since the defective areas on disk 10 should be skipped. Also, it may be noted that CPU 80 may be generally considered to be any data bank or supply, with the other circuit elements of FIG. 5 constituting a disk drive for transferring data between this data supply and the disk 10.

In describing now the operation of the circuit 72 shown in FIg. 5, reference also will be made to the timing diagram of FIGS. 7A-7C. Assume that data is to be stored on sector $S_1$ of track $T_{600}$ having a defective area identified with an address on the address recording area 14' of the sector identification area 14. The head 30 will be positioned over this track $T_{600}$ in accordance with well known disk drive servo circuitry. The motor 38 also will be activated to rotate the disk 10 with the head 30 over $T_{600}$.

When the beginning of sector mark on the sector identification area 14 of sector $S_1$ is sensed by head 36 and detector 34, and output signal on line 76 instructs the drive control unit 74 to activate the read amplifier 42 to amplify the information read by head 30 including the defective area address recorded on the area 14'. This address will then be detected by detector 86 and fed through the control unit 74 as one input to the comparator 92. Also, sector counter 80 will have a count of 1 corresponding to sector $S_1$, whereby control unit 74 will activate comparator 92 via line 93 to perform its compare function. Then, at the beginning of the data recording area 16 of sector $S_1$, the control unit 74 will request and continously receive data from CPU 80, which will be supplied to the oscillator 20 whose output signal on line 100 will correspond to each bit of data at its input on line 82.

FIG. 7A shows the time that head 30 is over the data recording area 16 of sector $S_1$. As the data recording area 16 of sector $S_1$ rotates beneath head 30, the bits from oscillator 20 will be received by counter 48. If it is assumed in the present example that the defective area within the data recording area 16 of sector $S_1$ is at bit 221, the address on line 90 will correspond to byte 27. Until byte 27 is counted by counter 48, the comparator 92 will produce a high signal shown in FIG. 7b, which will enable gate 102 to deliver the bits through this gate and exclusive-Or gate 120 for writing by the head 30. Gate 108 also will be enabled for the first two bytes received since the output of two byte delay 116 will not follow the output of inverter 112 low for a two-byte period; however, since buffer 104 is two bytes in length there will be no data to output from this buffer for a two byte period. At the end of this two byte period, gate 108 will be disabled.

Then, as the disk 10 continues to rotate, and the data is continuously supplied over line 82, counter 48 eventually will reach a count of 27 corresponding to the address on line 90. Accordingly, the output of comparator 92 on line 98 will go low, as indicated in FIG. 7B; therefore, gate 102 will be disabled. Also, the output of inverter 112 will go high, but the output of delay 116 will remain low for a two-byte period. Consequently, during this two byte period no data will be supplied to head 30 and this is the desired result since at this time the head 30 will be over the defective area which, as mentioned previously, is assumed to be two bytes in length.

More specifically, when the comparator 92 goes low at the detection of the assumed defective area, bit 215 will be at the input stage of buffer 104 and bit 200 will be at the output stage of buffer 104, with bits 200–215 already being recorded via gate 102. Then, as disk 10 continues to rotate and at the end of the two byte period, bits 216 through 231 will be stored in buffer 104 with bit 216 being at the output stage and bit 231 being at the input stage of buffer 104. At this time, the output of delay 116 will go high, as indicated in FIG. 7C; consequently, at this time gate 108 will be enabled and remain enabled for the remaining data recording area 16 beyond the assumed defective area to record bits 216 to 4096 via buffer 104. At the end of the sector $S_1$, the circuit 72 will be reset with reset signal (not shown), including the end of sector mark, to begin recording the data for another sector S of a track T in a similar manner as sector $S_1$ of track $T_{600}$.

The circuit 72 has been described as not recording data on the defective area. However, such circuit may be modified to set the write trigger 24 with the control unit 74, which may respond to the output of the comparator 92 once the defective area is detected, to record constant frequency, long wave data on such defective area. This long wave data would then be used in a standard manner for resynchronizing a VCO (voltage controlled oscillator) (not shown) used for read-back of the recorded data. Without such long wave data, a change in phase of the VCO might occur which could cause incorrect read-back. Other conventional resynchronization techniques may also be used.

The fact that the present invention has the advantage of not reducing the storage capacity of the recording surface 12 can be described in the following way. Assume, as has already been indicated, that the bit capacity of each sector $S_1$–$S_{16}$ of a given track T is 4096 bits when the sectors are free of any defective areas. With such a defective area free disk, all the space on a data recording area 16 of a given sector S can be utilized to record these 4096 bits. However, if there is a defective area, in accordance with the one example of the present invention given above, there will be two bytes or sixteen bits of overhead or less space available on which to record the 4096 bits. Once this reduction in usable area 16 is known, then the motor 38 and oscillator 20 can be designed so that the speed of rotation of the disk 10 and the write frequency is greater, proportionally to the size of the defective area, over a normal speed and frequency if the disk 10 had no defects. In other words, in the example given, 512 bytes of data will now have to fit into a data recording area length of 510 bytes due to the defective area, rather than of 512 bytes. Since there is a two-byte reduction of recording space, the motor should be designed to have a speed which is higher by 2/512 or about 0.004%. Also, the oscillation frequency of oscillator 20 would be higher by a similar percentage, so that the data is being written faster to account for the less space available due to the defective area. There will thus be, in effect, an increase in data density. It will be appreciated that the user of the disk drive 72 and disk 109 need not even known of this increase in motor speed 38 and oscillation frequency 20, nor of the defective area; to the user, the disk 109 and drive 72 will be able to record a full capacity of 4096 bits on each sector $S_1$–$S_{16}$ of each track $T_1$–$T_{800}$.

It also will be appreciated from the above discussion that buffer 104 should be of a certain size to avoid recording on the defective areas of disk 10. Generally, this size must be large enough to encompass the maximum number of bytes which may eventually be affected by a defective area initially on a disk 10 as manufactured, plus a number of bytes equal to any variation in byte count caused by the effect of changes in the speed of motor 38 and the write frequency of oscillator 20 shown in FIG. 5 which would cause the byte count in counter 48 shown in FIG. 5 to change. In other words, in the example given throughout this disclosure, a sector S or a track T on disk 10 as initially manufactured may be only 1 bit in length, but eventually may grow longer to 10 bits. Also, any change in motor speed or write frequency, such as an increase in this speed or frequency, may result in a comparison by comparator 92 sooner than if no such increase occurred, since counter 48 will reach a count corresponding to the address on line 90 quicker. As one example, a buffer 104 of 2 bytes in size is considered sufficient to account for these factors under present technology.

With the data now recorded on the disk 10, a circuit 122 shown in FIG. 6 may be utilized to read the data from recording surface 12. Again, like numerals are used to indicate similar elements shown in FIG. 5. The disk drive control unit 74 receives as one input over a line 124, the output of the sector detector 34 and an input over a line 126 from the output of sector counter 80. One output from disk drive control unit 74 is fed over a line 128 to the read amplifier 42 for amplifying the information read by head 30, this information being detected by detector 86 and sent via a line 130 to the control unit 74 as another input. Another output from the disk drive control unit 74 is the address to a defective area which is fed on a line 132 as one input to the comparator 92, while a yet other output from unit 74 is a signal on a line 133 which activates comparator 92 in response to the control unit input on line 126 from sector counter 80. The disk drive control unit 74 also receives the data read by head 30 from an exclusive-OR gate 134 via line 136 and continuously supplies this data from line 136 to an output line 138 for transfer to the CPU 80.

The data from detector 86 on line 130 is also fed to counter 48 which is set to count data on a recording area 16 by a control signal on a line 139 from unit 74 and which supplies an output corresponding to the count over a line 140 as the other input to comparator 92. The data on line 130 is also fed through the buffer 104 as one input to an And gate 142 and directly as one input to another And gate 144. The other input to gate 142 is the output of a two-byte delay 145 on a line 146, whose input is the control signal from the output of comparator 92 on a line 148. The other input to gate 144 is the output on a line 150 of an inverter 152 whose input is the output of comparator 92 on a line 148. As will be appreciated from the discussion below, even though head 30 will not continuously read data recorded on a sector S of a track T due to a data gap in view of the defective area, this data will be continuously supplied at the output of gate 134 to continuously transfer the data to CPU 80.

In discussing the operation of circuit 122, it will be assumed that the data recorded on sector $S_1$ of track $T_{600}$ with the circuit of FIG. 5, as already discussed, is now desired to be read. The head 30 will be moved to track $T_{600}$ and the disk 10 rotated to place this sector $S_1$ under head 30. Head 36 and sector detector 34 will provide an output on line 124 when the beginning of sector mark is detected for sector $S_1$. In response to the signal on line 124, the disk drive control unit 74 will activate the amplifier 42 to amplify the information read by the head 30 so that the address on area 14' of sector $S_1$ to the defective area is transferred from detector 86 thgough the control unit 74 to line 132 as one input to comparator 92. Thereafter, when head 30 begins reading the data recorded on the data recording area 16, the disk drive control unit 74, in response to the signal on line 124 from sector detector 34 will activate counter 48 via line 139 to begin counting the data bits from detector 86, and activate comparator 92 via line 133 in response to the signal on line 126 from sector counter 80.

From the time recording head 30 begins sensing data on area 16 until the time head 30 is over the defecting area the output of comparator 92 will be high. This high signal will be delayed by two bytes by delay 145, as indicated in FIGS. 8A and 8B which show the total time that head 30 is oven area 16 and the output of delay 145, respectively. Also, the output of comparator 92 will be inverted by inverter 152 to disable gate 144. Thus, for the fist 2 bytes no data will flow from gate 134 since gate 144 will be disabled and buffer 104 will be receiving these 2 bytes with gate 142 also being disabled.

After this delay of two bytes, at which time bit 1 will be at the output stage of buffer 104 and bit 15 at the input stage, gate 142 will be enabled, thereby gating the data from buffer 104 through gate 134 to control unit 74 and ultimately to the CPU 80. When the head 30 reaches the assumed defective area, the count in counter 48 will compare with the address on line 132 so that the output of comparator 92 will go low. At this time gate 144 will be enabled by the output of inverter 152 shown in FIG. 8C, but there will be no data from detector 86 since no data will have been recorded on the defective area, except possibly the long wave data used for resynchronization purposes already described. Gate 142 will continue to be enabled by the delayed output of delay 145 to gate the data in buffer 104 which will be the two bytes immediately preceding the beginning of the defective area, including bits 200–215. Then, after this two-byte delay, the buffer 104 will have no data in view of the defective area, and the output of detector 86 will be bit 216 recorded in the bit position next succeeding the defective area. Since gate 142 will now be disabled and gate 144 will be enabled until the end of sector $S_1$, the remaining data after the defective area data will be transferred through gates 144 and 134 to the disk drive control unit 74 and ultimately to CPU 80. Thus, it will be appreciated that while head 30 does not continuously read the data recorded on surface 12 in view of the gap provided by the defective area, the output of gate 134 will be a continuous stream of read-back data which is continuously fed through control unit 74 to CPU 80. Of course, the circuit 122 may be modified in any conventional manner (not shown) to read the long wave data mentioned above for the resynchronization purposes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of transferring data between a data supply and a disk file including a disk having a track divided into sectors, each sector having an address recording area followed by a data recording area, and one sector having a defective area, comprising the steps of:
    (a) detecting the defective area on the data recording area to identify the defective area;
    (b) writing an address of the defective area on the address recording area;
    (c) recording data on the data recording area of the one sector including;
        (i) continuously receiving data from the data supply for recording on the one sector,
        (ii) detecting the defective area, with the address written on the address recording area;
        (iii) writing a first part of the received data on the data recording area until the defective area is detected,
        (iv) delaying writing the remaining part of the received data when the defective area is detected to avoid writing on the defective area, and
        (v) subsequently writing the remaining part of the data on the data recording area succeeding the defective area; and
    (d) continuously delivering the data written on the data recording area to the data supply, including:
        (i) detecting the defective area with the address written on the address recording area;
        (ii) reading the data written on the data recording area;
        (iii) transferring with delay to the data supply the first part of the data read from the one sector between the beginning of the data recording area and the defective area until the defective area is detected; and (iv) transferring without delay to the data supply the remaining data read from the one sector succeeding the defective area.

2. A method of transferring data between a movable recording medium and a data supply, the recording medium having a track divided into sectors, each sector having an address recording area and a data recording area, and one sector having a defective area within the data recording area and an address of the defective area on the address recording area, comprising the steps of:
   (a) continuously receiving data from the data supply for recording on the one sector; and
   (b) recording all of the received data on the data recording area of the one sector, except on the defective area, by detecting the defective area, writing a first part of the received data on the data recording area until the defective area is detected, delaying writing the remaining part of the received data when the defective area is detected to avoid writing on the defective area, and subsequently writing the remaining part of the data on the data recording area succeeding the defective area.

3. A method according to claim 2 wherein the step of delaying comprises:
   (a) feeding all the received data through a buffer; and
   (b) gating the data in the buffer through a first gate commencing with the start of the remaining part of the data.

4. A method according to claim 3 wherein the step of detecting comprises:
   (a) reading the address to the defective area;
   (b) counting the received data as it is recorded on the data area and generating a count signal;
   (c) comparing the address to the count signal;
   (d) generating a first control signal to gate the first part of the received data through a second gate until a comparison is made between the address and the count signal; and
   (e) generating a second control signal after the comparison is made to gate the remaining part of the data in the buffer.

5. A method of transferring data between a movable recording medium and a data supply, the recording medium having a track divided into sectors, each sector having an address recording area and a data recording area, and one sector having a defective area within the data recording area and an address of the defective area on the address recording area, comprising the steps of:
   (a) continuously receiving data from the data supply for recording on the one sector;
   (b) recording all of the received data on the data recording area of the one sector, except on the defective area;
   (c) reading information on the one sector including reading the data recorded on the data recording area and reading the address of the defective area on the address recording area; and
   (d) continuously delivering the read data to the data supply, be detecting the defective area, transferring with delay to the data supply the data recorded on the one sector between the beginning of the data recording area and the defective area until the defective area is detected, and transferring without delay to the data supply the remaining data recorded on the one sector succeeding the defective area.

6. A method according to claim 5 wherein the step of transferring with delay comprises:
   (a) feeding all the data read from the data recording area through a buffer; and
   (b) gating the data in the buffer through a first gate until the defective area is detected.

7. A method according to claim 6 wherein the step of transferring without delay comprises gating the remaining data through a second gate after detection of the defective area.

8. Apparatus for transferring data between a data supply unit and a storage medium having a track divided into a plurality of sectors with each sector having an address recording area and a data recording area, and at least one sector having an address on the address recording area of a defective area within the corresponding data recording area, comprising:
   (a) means for continuously receiving data from the data supply to be stored on the one sector; and
   (b) means for recording all of the received data on the data recording area of the one sector, except on the defective area, said means for recording comprising means for detecting the defective area, and means, connected to said detecting means, for writing without delay a first part of the received data on the data recording area until the defective area is detected and for writing with delay the remaining received data when the defective area is detected to avoid writing on the defective area.

9. Apparatus according to claim 8 wherein said means for writing comprises:
   (a) a recording head;
   (b) a buffer means through which the received data is fed; and
   (c) switchable gating means to gate the data either directly from the data receiving means to the recording head, or from the buffer means to the recording head.

10. Apparatus according to claim 9 wherein said means for detecting comprises:
    (a) means for sensing the address;
    (b) means for counting the received data; and
    (c) means for comparing the count in said counting means to the sensed address to control said gating means.

11. Apparatus for transferring data between a data supply unit and a storage medium having a track divided into a plurality of sectors with each sector having an address recording area and a data recording area, and at least one sector having an address on the address recording area of a defective area within the corresponding data recording area, comprising:
    (a) means for continuously receiving data from the data supply to be stored on the one sector;
    (b) means for recording all of the received data on the data recording area of the one sector, except on the defective area;
    (c) means for reading the data recorded on the one sector;
    (d) means for continuously feeding the read data to the data supply unit, said means for continuously feeding comprising means for detecting the defective area, buffer means to receive the read data, and switchable gating means to gate the read data either out of said buffer means to said means for continuously feeding until the defective area is detected or directly to said means for continuously feeding after defective area is detected.

12. Apparatus according to claim 11 wherein said means for detecting comprises:
    (a) means for sensing the address;
    (b) means for counting the read data; and
    (c) means for comparing the count in said counting means to the sensed address to control said gating means.

* * * * *